United States Patent [19]

Ross

[11] Patent Number: 5,466,779
[45] Date of Patent: Nov. 14, 1995

[54] PRODUCTION OF POLYSUCCINIMIDE

[75] Inventor: Robert J. Ross, Elmhurst, Ill.

[73] Assignee: Donlar Corporation, Bedford Park, Ill.

[21] Appl. No.: 243,955

[22] Filed: May 17, 1994

[51] Int. Cl.$^6$ .............................. C08G 69/00; C08G 73/10
[52] U.S. Cl. ........................ 528/363; 528/328; 528/367; 525/418; 525/419; 525/420
[58] Field of Search ................................. 528/363, 328, 528/367; 525/418, 419, 420

[56] References Cited

U.S. PATENT DOCUMENTS

| | | | |
|---|---|---|---|
| 4,839,461 | 6/1989 | Boehmke | 528/328 |
| 5,116,513 | 5/1992 | Koskan et al. | 528/328 |
| 5,219,952 | 6/1993 | Koskan et al. | 528/328 |
| 5,221,733 | 6/1993 | Koskan et al. | 528/363 |
| 5,296,578 | 3/1994 | Koskan et al. | 528/363 |

*Primary Examiner*—P. Hampton-Hightower
*Attorney, Agent, or Firm*—Olson & Hierl, Ltd.

[57] ABSTRACT

Polysuccinimide is prepared by reacting ammonia gas with liquid maleic anhydride. The reaction is initially carried out at a temperature which is above the melting point of the maleic anhydride but below the boiling point of liquid maleic anhydride for a time period sufficient for the liquid maleic anhydride to react with the ammonia gas to form a reaction product thereof. The reaction product is subsequently polymerized to polysuccinimide. The present method avoids the prior art problems of water removal and minimizes the need for ammonia handling equipment. The polysuccinimide product can be readily hydrolyzed to polyaspartic acid or a salt thereof, if desired.

13 Claims, No Drawings

PRODUCTION OF POLYSUCCINIMIDE

FIELD OF THE INVENTION

This invention relates to a method for the production of polysuccinimide and polyaspartic acid.

BACKGROUND OF THE INVENTION

Polysuccinimide is a precursor of polyaspartic acid. Both have been formed by a number of methods known in the art. The term polyaspartic acid as used herein refers to the free acid and to the salts of polyaspartic acid. Polyaspartic acid is suitable as an antideposition agent, and as a plant nutrient uptake facilitator. Polysuccinimide itself is useful as a builder for detergent compositions, and also as an antideposition agent.

It is known that relatively high molecular weight polysuccinimide can be produced by first reacting maleic anhydride, water and ammonia and then polymerizing that reaction product with a preformed polysuccinimide at a higher temperature (Koskan et al. U.S. Pat. No. 5,219,952). Thereafter the polysuccinimide can be base hydrolyzed to polyaspartic acid, if desired.

U.S. Pat. No. 5,116,513 to Koskan et al. teaches the thermal polymerization of aspartic acid to polysuccinimide, which is then hydrolyzed to polyaspartic acid. It is also known that polyaspartic acid can be produced by reacting maleic anhydride, water and ammonia at a molar ratio of maleic anhydride to ammonia of 1:1 to 1:1.5 at 120° to 150° C. (Boehmke U.S. Pat. No. 4,839,461).

Such prior art processes suffer from various disadvantages, however. For one thing, they are capital intensive, energy intensive, and time consuming because the maleic anhydride is mixed with water at elevated temperature, the ammonia is added in a manner minimizing ammonia loss, and the water of solution is evaporated with vacuum or heating. Also, expensive ammonia handling equipment is needed at all stages of the reaction.

The art needs a new and improved method for producing polysuccinimide from maleic anhydride and ammonia which overcomes these disadvantages.

SUMMARY OF THE INVENTION

Polysuccinimide can be produced in unexpectedly high yields by reacting liquid maleic anhydride with ammonia gas at a temperature of above about 55° C., followed by polymerization of the resulting reaction product at a temperature of at least about 170° C.

More particularly, polysuccinimide is prepared in a multi-step method using a substantially anhydrous gas and liquid maleic anhydride as starting reaction admixture by first contacting ammonia gas with liquid maleic anhydride to form a reaction product which is then polymerized.

The contemplated method for preparing a polysuccinimide comprises the steps of:

(a) contacting ammonia gas with liquid maleic anhydride at a reaction temperature above the melting point of maleic anhydride and below the boiling point of liquid maleic anhydride while maintaining said maleic anhydride molten for a time period sufficient to produce a reaction product;

(b) discontinuing said introduction of ammonia gas; and (c) then polymerizing the reaction product obtained in step (a) by heating said reaction product to a polymerization temperature and maintaining said polymerization temperature for a time period sufficient to effect polymerization of said reaction product to polysuccinimide.

Another method for preparing polysuccinimide comprises the steps of:

(a) forming a reaction admixture by contacting ammonia gas with liquid maleic anhydride at a reaction temperature below the boiling point of the said liquid maleic anhydride;

(b) maintaining said admixture at said reaction temperature for a time period sufficient to form a substantially solid reaction product;

(c) discontinuing said introduction of ammonia gas;

(d) recovering the produced reaction product; and (e) thereafter heating the collected reaction product to a temperature and for a time period sufficient to effect polymerization of said reaction product to polysuccinimide.

The reaction product is predominantly maleamic acid or its ammonium salt, or mixtures thereof. The reaction product may be recovered and polymerized in a separate vessel or, preferably, is directly heated to a temperature of above about 170° C. for a period of time sufficient to produce polysuccinimide, generally from about 2 to about 6 hours. The resulting polysuccinimide can be hydrolyzed to polyaspartic acid using alkali metal hydroxide, e.g., sodium hydroxide, and the like.

In practicing the first step of the present invention, upon contact with liquid maleic anhydride the absorption of ammonia gas proceeds relatively rapidly. The flow of ammonia gas into the reaction vessel is controlled so as to limit the exposure of the reaction product to excess ammonia.

Beneficial advantages of the process of the present invention over previous processes are the relatively inexpensive nature of the starting materials (anhydrous ammonia gas and maleic anhydride) as well as no need for a solvent in the process. Both of these advantages lower the overall cost of production for polysuccinimide and the polyaspartic acid derived from it.

The present inventive method thus overcomes the problems associated with the above-indicated prior art methods of making polysuccinimide by avoiding the need to add an ammonia solution under conditions which avoid ammonia loss and by avoiding the need to evaporate the water of solution. If desired, the polysuccinimide product can be base hydrolyzed to polyaspartic acid.

Other and further aims, purposes, features, advantages, embodiments and the like will be apparent to those skilled in the art from the present specification and the appended claims.

DESCRIPTION OF THE INVENTION

Briefly described, in the practice of this invention, a substantially anhydrous ammonia gas and liquid maleic anhydride are contacted at a molar equivalent ratio of ammonia to maleic anhydride sufficient to form a substantially solid reaction product. This reaction product is subsequently thermally polymerized to polysuccinimide.

More particularly, liquid maleic anhydride can be obtained by heating particulate maleic anhydride to a temperature elevated sufficiently above its melting point range of about 54° C. to about 56° C. to melt. The molten maleic anhydride is maintained below its boiling point range of about 200° C. to about 202° C., however. Preferably, the liquid maleic anhydride is maintained at a reaction temperature within a range of above about 55° C. but less than about 150° C. before starting the introduction of ammonia gas. The liquid maleic anhydride in the reaction vessel can be in any convenient form for gas-liquid contact, e.g., a pool, a film or a spray when the ammonia gas is contacted therewith.

The temperature of the reaction admixture is maintained, preferably, within a range of above about 55° to about 160°, more preferably about 85° C. to about 150° C., most preferably about 100° C. to about 110° C., until a substantially solid reaction product of ammonia and maleic anhydride is formed. References to "solid reaction product" herein include maleamic acid, its ammonium salt and mixtures thereof. Preferably, the resulting gas-liquid reaction is carried out until substantially the entire bulk of liquid maleic anhydride in the reaction admixture is converted to a substantially solid reaction product. The flow rate of the ammonia gas to the reaction zone is preferably controlled to avoid loss of ammonia to the environment by conventional gas handling devices.

Higher and lower temperatures can be employed, if desired, to obtain a reaction product. The so heated reaction product is maintained at such a reaction temperature for a time period that is sufficient to react the liquid maleic anhydride with the ammonia gas. Typically, a substantially solid reaction product begins to form within about 1 to about 5 minutes of contact and is completely formed within a time period of less than about one hour.

After the substantially solid reaction product is produced, the flow of ammonia gas is discontinued. Next, polymerization of the obtained reaction product to polysuccinimide is effected by further heating it to a temperature of at least about 170° C. A preferred polymerization temperature is within the range of about 170° C. to about 260° C. A more preferred polymerization temperature range is about 180° C. to about 240° C. The most preferred temperature is in the range of about 200° to about 210° C., at which the coloration of the polysuccinimide produced is decreased and the molecular weight is increased relative to polysuccinimide produced at higher temperatures. Typically, the polymerization reaction was completed within a time period of about 2 hours to about 6 hours.

After the polymerization reaction heating or the reaction is discontinued, the reaction mass is cooled. A solid, brittle, substantially uniform polysuccinimide reaction product is obtained upon cooling. This solidified product then can be broken up into a particulate mass by any conventional procedure, e.g., comminuting or grinding.

In one preferred method aspect, the reaction admixture is formed by substantially continuously feeding ammonia gas directly into a pool of liquid maleic anhydride, as by bubbling or sparging the ammonia gas. Commercially, continuous stirred tank or sparged-tower-absorber systems are suitable for this purpose, as well as other reactor systems available for continuous processes.

In another method embodiment, the first step of the method can be performed by feeding a stream of ammonia gas substantially continuously onto the surface of a pool of liquid maleic anhydride. In this aspect, the reaction product effectively forms at the gas-liquid interfacial surface of the liquid maleic anhydride and then progressively proceeds deeper until the entire liquid maleic anhydride pool is substantially solidified into the reaction product.

In yet another method embodiment, a stream of ammonia gas can be contacted by a film of liquid maleic anhydride, for example, as in a falling film absorber system, and the reaction product continuously collected for subsequent polymerization in a separate downstream reactor.

Alternatively, the first step of the method of this invention can be performed by absorbing ammonia gas into a spray of liquid maleic anhydride, as for example in a spray chamber or an ammonia tower absorber reactor unit, to form the reaction product which can then be collected for subsequent polymerization.

Preferably, each of the reactants is substantially anhydrous, i.e., the amount of free water (moisture) present in each of maleic anhydride and ammonia gas is less than about 1 weight percent. The mole ratio of liquid maleic anhydride to ammonia gas for a continuous process can be in the range of about 1:1 to about 1:2.

Preferably the introduction of ammonia gas into the reaction vessel is controlled in such a way as to limit the exposure of the intermediate maleamic acid formed in the reaction product to excess ammonia gas during the relatively high temperature thermal polymerization stage of the reaction. Overexposure to ammonia may lead to increased colorization in the final polysuccinimide product.

Exposure to ammonia gas can be controlled in a batch type process, for example, by halting the introduction of ammonia gas after the theoretical quantity of ammonia, e.g., 1 molar equivalent, has been absorbed by the maleic anhydride. In a continuous process, exposure to ammonia gas can be limited by reacting the maleic anhydride with ammonia gas in a flow system, such that the solid reaction product is recovered and removed to another section of the same reactor, or to another reactor, where it is subsequently thermally polymerized to polysuccinimide.

The method of this invention can be performed in any gas absorption reactor system suitable for controlling and continuously feeding a stream of ammonia gas through, onto, over or to otherwise contact ammonia gas with liquid maleic anhydride. Preferably, the reactor system is designed to contain the reaction product for the polymerization step so that polysuccinimide can be produced within a single reaction system.

The polysuccinimide produced in accordance with the present invention can be used per se, or it can be combined with aqueous ammonium hydroxide, sodium hydroxide, sodium carbonate, and the like, and be base hydrolyzed to produce salts of polyaspartic acid. Base hydrolysis can be carried out under a wide variety of conditions, but preferably is effected at a pH value of at least about 8 and higher, and at a temperature below about 80° C. While not a simple reaction, the hydrolysis generally follows an Arrhenius profile where the optimum temperature for the hydrolysis is at about 70° C. At a temperature above about 80° C. ammonia can be stripped from the polymer.

The following Examples further illustrate the invention. In each of the Examples 1–5, the formation of polysuccinimide reaction product thus produced, was confirmed by Infrared Spectroscopy (IR), collected and weighed and the yield calculated. The molecular weight of the polysuccinimide was then determined by base hydrolyzing a portion of the polysuccinimide with aqueous sodium hydroxide to form the sodium salt of polyaspartic acid and then performing Gel Permeation Chromatography (GPC) analysis to determine the molecular weight of the sodium polyaspartate.

For the hydrolysis procedure, about 0.5 grams of polysuccinimide were first dissolved in about 5 milliliters (mL) of water. About 5.2 mL of 1N NaOH solution were then gradually added over a period of about 10 minutes to form sodium polyaspartate. Next about 0.5 mL of the resulting sodium polyaspartate solution was diluted with about 10 mL of phosphate buffer solution (0.1M $KH_2PO_4$, pH 7) and the molecular weight and molecular weight distribution of the polyaspartate determined by GPC analysis.

GPC analysis was performed on a Shimadzu Model LC1OAD Chromatograph with UV detection set at 220 nanometers (nm) utilizing 2 Synchrom GPC columns in tandem, GPC 500 and GPC 1000 (250 mm×4.6 mm, each).

Weight average molecular weight (Mw), number average molecular weight (Mn) and polydispersity (Mw/Mn) were determined using a Hitachi D-2520 GPC Integrator and the four standards shown in Table 1. The Mw, Mn and Mw/Mn of the tested samples were determined by comparison to a calibration curve developed by linear correlation of retention time versus the log of the peak molecular weight (Mp) of the four standards. Elution was with 0.05N $KH_2PO_4$ buffer (pH 7).

TABLE 1

GPC Standards

| Standard | Peak Mol. Wt. (Mp) | Wt. Ave. MW(Mw)** | Number Ave. MW (Mn) | Polydisp. (Mw/Mn) |
| --- | --- | --- | --- | --- |
| Sodium PA* | 16,000 | 18,100 | 12,800 | 1.41 |
| Sodium PA* | 4,100 | 5,660 | 3,450 | 1.64 |
| Sodium PA* | 1,250 | 1,930 | 1,230 | 1.57 |
| Disodium L-Aspartate | 177 | 177 | 177 | 1.00 |

*Sodium polyacrylate from Polysciences Inc.
**As reported by Polysciences Inc.; measured by Low Angle Light Scattering (LALS).

EXAMPLE 1

9.8 Grams (100 mmol) of particulate maleic anhydride were placed in a PYREX glass Erlenmeyer flask (750 mL) which was then fitted with a two-holed rubber stopper having a gas inlet tube and a gas outlet tube. The gas inlet tube was adapted and positioned to feed gas onto the surface of the maleic anhydride. The gas outlet tube was attached to a gas washing bottle filled with water. The flask was then immersed in an oil bath preheated to about 140° C. The maleic anhydride melted to form a substantially clear liquid, at which point a stream of ammonia gas was then fed into the flask through the gas inlet tube so as to be passed over the surface of the liquid maleic anhydride at a flow rate of about one bubble per second. A substantially solidified reaction product formed after about 5 minutes.

The temperature of the oil bath was then gradually elevated to about 240° C. over a period of about 45 minutes. At a temperature of about 155° C. to about 160° C. the solidified reaction mixture began to liquify, bubble and darken in color. The ammonia flow was immediately discontinued at this point to stop further ammonia gas absorption.

The temperature of the oil bath was then heated to and maintained at about 240° C. for about 2 hours. During this maintenance period, after about 1 hour, a tacky, reddish-brown foam was produced. After about 2 hours, the produced foam became brittle. The flask was then removed from the oil bath and the contents thereof allowed to cool to ambient room temperature. The brittle solidified foam product was then broken up, collected and weighed to afford 7.7 grams of a brown powder (additional uncollected material remained on the sides of the flask). Based on the amount of collected product, the calculated yield was 77% of theoretical.

An infrared spectrum of the powder reaction product was judged identical to that of known polysuccinimide. GPC analysis of the reaction product after hydrolysis to sodium polyaspartate indicated a Mp of about 1071, Mw of about 1039, Mn of about 666, and an Mw/Mn of about 1.56. There were three low molecular weight peaks indicative of monomeric impurities which brought down the weight average molecular weight (Mw) below the peak molecular weight (Mp). Based on the area of the monomer peaks to the polymer peak, the calculated conversion to polymer was greater than about 95%.

EXAMPLE 2

9.8 Grams (100 mmol) of particulate maleic anhydride were placed in a round bottom PYREX™ glass flask (750 mL) fitted with a two-holed rubber stopper having a gas inlet tube and a gas outlet tube. The gas inlet tube was adapted and positioned to sparge the ammonia gas into the liquid maleic anhydride. The gas outlet tube was attached to a gas washing bottle filled with water. The flask was placed in an oil bath and the liquid maleic anhydride was heated to about 120° C. until it melted to form a substantially clear liquid pool.

Ammonia gas was then bubbled through the liquid maleic anhydride pool at a flow rate of about one bubble per second while the temperature was then gradually increased to about 150° C. over a period of about 15 minutes.

During this heating period, some small white crystals initially formed, the liquid then turned brown and bubbles were observed throughout the reaction mixture and a brown foam reaction product was produced. The ammonia flow was then discontinued. The temperature of the oil bath was then elevated until a temperature of about 240° C. was attained and this temperature was maintained for about 2 hours. The flask was then removed from the oil bath and the contents cooled to ambient room temperature. Upon completion of the reaction process, a brittle solidified brown reaction product was produced. The reaction product was collected and weighed to afford about 6.5 grams (additional uncollected material remained on the sides of the flask). Based on the amount of collected product, the calculated yield was 65% of theoretical.

The infrared spectrum of the reaction product was judged identical to that of known polysuccinimide. GPC analysis of the base-hydrolysed reaction product indicated a Mp of about 836, Mw of about 1070, Mn of about 705 and an Mw/Mn of about 1.516.

EXAMPLE 3

5 Grams (51 mmol) of particulate maleic anhydride were placed in a PYREX™ glass Erlenmeyer flask (500 mL) fitted with a two-hole rubber stopper having a gas inlet tube and a gas outlet tube. The gas inlet tube was adapted and positioned to feed ammonia gas over the surface of the maleic anhydride and the gas outlet tube was attached to a gas washing bottle filled with water. The flask was immersed in an oil bath heated at a temperature of about 100° C.–110° C. After about 1 minute, the maleic anhydride melted to a substantially clear, colorless liquid.

Ammonia gas was then fed so as to pass over the surface of the liquid maleic anhydride at a relatively modest flow rate of about 3 bubbles per second (as measured by an oil bubbler briefly attached to the gas outlet tube). Within about 2 minutes a white substantially solid reaction product formed at the gas-liquid interface, with some liquid remaining underneath. After about 2 to about 3 minutes, the entire reaction mixture had substantially solidified to a white reaction product, with some areas beginning to form a yellowish-brown glassy foam. The ammonia gas flow was immediately discontinued at this point to stop absorption.

The flask was then opened to the air and the oil bath was then heated to a temperature in the range of from about 200°

C. to about 210° C. During this heating, the reaction product began to foam and turned reddish-brown in color at a temperature in the range of from about 165° C. to about 170° C. The temperature of the oil bath was then maintained in a range of from about 200° C. to about 210° C. for about 2 hours. The flask was then removed from the oil bath and the contents cooled to ambient room temperature. The resulting reaction product was then scraped from the flask and weighed to afford about 4 grams of a reddish-brown brittle foam, which when ground to a fine powder, was pinkish tan in color. The amount recovered was calculated as a yield of about 80% of theoretical.

An infrared spectrum of the reaction product was judged identical to that of known polysuccinimide. GPC analysis of the base-hydrolysed reaction product indicated a $M_p$ of about 1372, Mw of about 1560, Mn of about 962 and a Mw/Mn of 1.62. The calculated conversion to polymer was greater than 90%.

EXAMPLE 4

The amounts and procedure in Example 3 were repeated under the same conditions to afford 4.1 grams of polysuccinimide. The amount recovered was calculated as a yield of about 83% of theoretical. The infrared spectrum confirmed that the reaction product was polysuccinimide and GPC analysis of the base hydrolyzed reaction product indicated a Mp of about 1372, Mw of about 1463, Mn of about 881, and a Mw/Mn of about 1.66. The calculated conversion to polymer was greater than 90%.

EXAMPLE 5

A reaction vessel was fitted with a gas inlet tube and a gas outlet tube and then charged with about 3 grams of particulate maleic anhydride. The gas inlet tube was adapted and positioned to feed ammonia gas over the surface of the maleic anhydride. The reaction vessel was then partially submerged in an oil bath heated at about 100° C. After about one minute the maleic anhydride had completely melted to a liquid. Ammonia gas was then fed into the reaction vessel to pass over and onto the liquid maleic anhydride, until a white substantially solidified reaction product formed. The reaction admixture was carefully observed and the flow of ammonia gas was halted when the surface of the solidified reaction product began to discolor.

The reaction vessel was then removed from the oil bath and the white solidified reaction product was analyzed by Infrared Spectroscopy and GPC. The white reaction product was judged identical, by both analyses, to known maleamic acid obtained from Frinton Laboratories.

The reaction vessel was then re-immersed in the oil bath heated at a temperature of about 250° C. to about 260° C. and maintained at such temperature for about 1 hour. During this maintaining period a red-brown brittle foam was produced. The reaction vessel was then removed from the oil bath and the contents allowed to cool to ambient room temperature. The reaction product was removed from the vessel to afford about 2 grams. The amount recovered was calculated as a yield of about 66% of theoretical.

The infrared spectrum of the final reaction product was judged identical to that of known polysuccinimide. GPC analysis of a hydrolyzed sample indicated a Mp of about 836, Mw of about 817, Mn of about 515, and an Mw/Mn of about 1.59. The calculated conversion to polymer was greater than about 90%.

In the examples presented above, the polysuccinimide produced by reaction of liquid maleic anhydride with ammonia gas and heating the resulting reaction product to above 170° C. is similar in appearance and molecular weight to polysuccinimide produced from maleic acid or maleic anhydride and aqueous ammonia.

What is claimed is:

1. A method for preparing a polysuccinimide which comprises the steps of:
   (a) contacting ammonia gas with liquid maleic anhydride at a reaction temperature above the melting point of maleic anhydride and below the boiling point of liquid maleic anhydride while maintaining said maleic anhydride molten for a time period sufficient to produce a reaction product;
   (b) discontinuing said introduction of ammonia gas; and
   (c) then polymerizing the reaction product obtained in step (a) by heating said reaction product to a polymerization temperature and maintaining said polymerization temperature for a time period sufficient to effect polymerization of said reaction product to polysuccinimide.

2. The method of claim 1 further including the step of cooling the polysuccinimide to ambient room temperature.

3. The method of claim 2 further including the step of hydrolyzing said polysuccinimide to polyaspartic acid or salt thereof.

4. The method of claim 1 wherein the reaction temperature in step (a) is in the range of about 55° C. to about 160° C.

5. The method of claim 1 wherein the polymerization temperature in step (c) is at least about 170° C.

6. The method of claim 1 wherein the polymerization temperature in step (c) is in the range of about 170° C. to about 260° C.

7. The method of claim 1 wherein in step (a) the ammonia gas is introduced onto or over the surface of the liquid maleic anhydride.

8. The method of claim 1 wherein in step (a) the ammonia gas is sparged into the liquid maleic anhydride.

9. The method of claim 1 wherein in step (a) the liquid maleic anhydride is in the form of a pool, film or spray.

10. The method of claim 1 wherein said reaction temperature in step (a) is maintained over a time period of at least about 1 minute to about 1 hour.

11. The method of claim 1 wherein the method is continuous and mole ratio of said maleic anhydride to said ammonia gas during contacting is maintained at about 1:1 to about 1:2.

12. The method of claim 1 further including the step of comminuting the produced polysuccinimide.

13. A method for preparing polysuccinimide which comprises the steps of:
   (a) forming a reaction admixture by contacting ammonia gas with liquid maleic anhydride at a reaction temperature below the boiling point of the said liquid maleic anhydride;
   (b) maintaining said admixture at said reaction temperature for a time period sufficient to form a substantially solid reaction product;
   (c) discontinuing said introduction of ammonia gas;
   (d) recovering the produced reaction product; and
   (e) thereafter heating the collected reaction product to a temperature and for a time period sufficient to effect polymerization of said reaction product to polysuccinimide.

* * * * *